Patented Sept. 14, 1948

2,449,411

UNITED STATES PATENT OFFICE 2,449,411

METHOD OF PREPARING SYNTHETIC SPICE

Gustav H. Rapaport, Kansas City, Mo.

No Drawing. Application March 5, 1945, Serial No. 581,185

9 Claims. (Cl. 99—140)

This invention relates to a flavoring compound suitable for use as a synthetic spice and method of preparing same.

This application is filed as a continuation in part of my copending application filed June 29, 1942, Serial No. 449,024, now abandoned.

It is the object of the present invention to provide an insoluble type of flavor which can serve as substitutes for spices, to provide a new and improved flavor carrying base which will have the characteristic, appearance and baking properties of natural spice powder, to provide a powdered flavor in which the deterioration of the volatile constituents will be eliminated or considerably reduced, and to provide a more practical synthetic spice of better keeping qualities than has been heretofore possible by known processes.

It is well known that it is advantageous to use powdered flavors instead of liquid extracts for many baking and cooking purposes; such flavors whose common characteristic property is their solubility and dispersibility are well known and will not be the object of the present invention which will restrict itself to synthetic spice, made substantially insoluble when used in doughs in order to show up as a separate entity after the baking process is completed.

It has been found that with powdered flavor compounds, because of the many bodies presenting a relatively large surface area of the particles, the volatile constituents will fade out within a short time. There is also considerable oxidation of certain constituents.

In certain types of powdered flavors, such as spice substitutes, it is necessary to use a flavor carrier (absorbent) which does not dissolve in the dough, and does not release the flavor and color during the baking process, nor absorb considerable quantities of moisture from the dough.

In accordance with my invention, I have found that flours such as wheat, rye, soy, or other cereal flour, can be employed for this purpose and the desired result accomplished if the moisture content of the flour is reduced by heating to a temperature at which the natural sugars of the flour become caramelized. This heat treatment simultaneously denatures the proteins of the flour, thus rendering the particles substantially insoluble.

While the glutens of untreated flours have the tendency to stick together and form more or less viscous doughs, such a heat treatment in the presence of moisture in addition to the modification of starches, denatures the proteins and destroys their ability to cohere.

This toughening effect of the heat treatment can be enhanced if the flour, prior to the heat treatment, is blended and agitated with an additional amount of moisture, e. g. 15 to 65% of its weight in water.

This can be done by blending the flour with the water to a dough, breaking the dough in small pieces and toasting in a rotary roaster, such as is used for the roasting of coffee or cereals, and thereafter crushing the toasted dough to a fine powder.

The same results may be obtained by an ordinary baking process well known to the art.

Coffee roasters employ direct heat and a current of hot air, while the well known rotary cereal roasters employ steam heat and pressure.

Another method of practicing my invention consists in hydrating the flour by incorporating in the flour 10 to 20% moisture in the form of finely divided water or steam and heat treating the flour by agitation at a temperature sufficient to obtain caramelization of the natural sugars of the flour until the desired color is obtained.

An additional color variation may be obtained by adding to the flour, small quantities of sugars, molasses or diastase.

The following are specific examples of practice of my process:

Example 1

To produce a spice carrier according to my invention 600 pounds of flour are mixed with 300 pounds of water in any standard dough mixer for about 10 minutes. If desired, 10 to 60 pounds of sugar or any sweet syrup can be added to increase the caramelization effect. This dough is rolled into thin sheets, cut in small pieces and baked in an ordinary bakery oven for 30 to 50 minutes at a temperature of approximately 400° to 500° F. After leaving the oven, the toasted dough pieces are transported through a current of cold air into a pulverizer, where they are crushed to a fine powder.

This carrier powder is mixed with 1 to 10% of its weight of the flavor compound, and sifted to the desired fineness.

Example 2

500 pounds flour to which, if a darker color is desired, a certain quantity of a sugar may be added, are blended with 125 pounds of water to form a stiff dough, this dough shredded into uniform particles and the particles subjected to a current of hot air in a rotary roaster and hereafter treated as in Example 1.

Example 3

600 pounds of cereal flour are agitated in a horizontal flour mixer and simultaneously 90 pounds of water sprayed into the flour until uniformly distributed. Hereafter, the flour is transferred into a solid drum roaster in which a temperature of 220° to 300° F. is maintained. The flour remains in the roaster for a period of 40 to 50 minutes.

This heat treatment causes, first, the proteins of the flour to become denatured and non-sticky, and as dehydration proceeds, caramelizes the flour to the desired color.

After leaving the roaster, the flour particles are cooled, blended with the spice oil and sifted to the desired fineness.

In practicing my invention to prepare a more stable cinnamon flavor, I have discovered that by adding to the flavor a lecithin of commerce, preferably in combination with vegetable oil as a protective additive, the flavor is not lost by contact with air, or when subjected to high temperatures; also such flavors may be stored almost indefinitely without losing their effectiveness.

The main ingredient used in preparing a synthetic cinnamon flavor is cinnamic aldehyde. This aldehyde is known to readily oxidize to cinnamic acid which does not have the flavor of cinnamon. Therefore, synthetic cinnamon flavors lose most of their characteristic aroma and taste on storage and "bake out" even when used fresh because the heat seems to accelerate the oxidation reaction. I have found this reaction is eliminated or at least the speed of reaction greatly reduced, when lecithin is present. This effect is further enhanced by the incorporation of a hydrogenated vegetable oil.

Lecithin is known to be an anti-oxidant for fats. This property does not fall within the scope of the present invention which is only concerned with the newly discovered property of lecithin to increase the stability of aldehydes.

This is probably due to the fact that lecithin has a greater affinity for oxygen than cinnamic aldehyde; consequently lecithin is oxidized to the exclusion of the aldehyde. Therefore, the aldehyde is unchanged and retains its aromatic characteristics and the material may be stored over a long period of time and also withstand baking temperatures.

It is also possible, that the known deterioration of synthetic cinnamon flavors of prior art was due not to oxidation but to reduction of the carbonyl group by some of the enzymes, sugars or other components of the flour which in the present process is prevented by the addition of lecithin. Therefore, I do not desire to be bound to any theoretical explanation.

In producing a synthetic spice in accordance with my invention, I use for example 100 pounds of the spice carrier in which a suitable amount of flavor base, for example, 10 pounds of cinnamon flavor base, has been incorporated by stirring or mixing in the conventional manner, as is well known in the art. This flavor base may be composed for example of two pounds cinnamic aldehyde, one-half pound crude lecithin and seven and one-half pounds vegetable oil. The fat which may have a melting point of about 120° F. is added to the absorbent material in which the flavor has been incorporated. The absorbent material is agitated and/or rotated while the fat is being added thereto so that when the solvent comes in contact with the cooler surface of the absorbent material a thin film of hardened material is formed around each particle of the carrier.

Various flavoring materials well known in the art may be employed in the practice of my process.

While I have described a method for preparing synthetic spices, the same method may be employed analogically for flavoring of prepared flours, baked goods, pie fillings, etc.

What I claim and desire to secure by Letters Patent is:

1. The method of preparing a synthetic spice which consists in heating cereal grain flour in the presence of moisture until the natural sugars of the cereal grain flour have been caramelized and said flour rendered substantially insoluble when incorporated in bakery products, cooling the caramelized cereal grain flour, and adding a spiced oil and incorporating the same into the caramelized cereal grain flour.

2. The method of preparing a synthetic spice which consists in mixing a cereal grain flour and water, heating the mixture until the natural sugars of the cereal grain flour have been caramelized and said flour rendered substantially insoluble when incorporated in bakery products, cooling the caramelized cereal grain flour, and adding a spiced oil and incorporating the same into the caramelized cereal grain flour.

3. The method of preparing a synthetic spice which consists in mixing a cereal grain flour and water, heating the mixture at a temperature sufficient to render the particles of the flour substantially insoluble when incorporated in bakery products, said mixture being heated until the natural sugars of the cereal grain flour have been caramelized, cooling the caramelized cereal grain flour, adding lecithin to and incorporating the same with a synthetic spice oil containing aldehyde, and adding the thus treated spice oil to the cooled caramelized cereal grain flour and incorporating the same therein.

4. The method of preparing a synthetic spice which consists in mixing a cereal grain flour, sugar and water, heating the mixture at a temperature sufficient to render the particles thereof substantially insoluble when incorporated in bakery products, said mixture being heated until the sugars therein including the natural sugars have been caramelized, cooling the caramelized cereal grain mixture, adding lecithin to and incorporating the same within a synthetic spice oil containing aldehyde and an edible oil, and adding the thus treated spice oil to the cooled caramelized cereal grain product and incorporating the same therein.

5. The method of preparing a synthetic spice which consists in mixing a cereal grain flour and water to form a dough, separating the dough into small pieces, heating the dough pieces at a temperature sufficient to render the particles thereof substantially insoluble when incorporated in bakery products, said dough being heated until the natural sugars thereof have been caramelized, cooling the caramelized cereal grain product, crushing the pieces thereof to a fine powder, and adding a spice oil and impregnating the particles of the caramelized cereal grain product therewith.

6. The method of preparing a synthetic spice which consists in mixing a cereal grain flour and water to form a dough, separating the dough into small pieces, heating the dough at a temperature sufficient to render the particles of the flour substantially insoluble when incorporated in bakery products, said dough being heated until the natural sugars therein have been caramelized, cooling the caramelized cereal grain products, crushing the pieces to a fine powder, adding lecithin to and incorporating the same within a synthetic spice oil containing aldehyde, and adding the thus treated spice oil to the cooled caramelized cereal grain product and incorporating the same therein.

7. The method of preparing a synthetic spice which consists in mixing one hundred (100) parts by weight of cereal grain flour with fifteen (15) to twenty (20) parts by weight of water, heating the mixture at a temperature sufficient to render same insoluble when incorporated in bakery products, said mixture being heated until the natural sugars thereof have been caramelized, cooling the caramelized cereal grain products, and impregnating the particles with a mixture of spice oil, lecithin and edible oil.

8. The method of preparing a synthetic spice which consists of mixing one hundred (100) parts by weight of cereal grain flour with fifteen (15) to fifty (50) parts by weight of water, heating the mixture at a temperature sufficient to render same insoluble when incorporated in bakery products, said mixture being heated until the natural sugars thereof have been caramelized, cooling the caramelized cereal grain product, crushing the caramelized cereal grain product to a fine powder, and impregnating the particles of said product with a mixture consisting of two (2) parts by weight of cinnamic aldehyde, one-half (½) part by weight of lecithin, and seven and one-half (7½) parts by weight of vegetable oil.

9. The method of preparing a synthetic spice which consists of mixing one hundred (100) parts by weight of cereal grain flour, two (2) to ten (10) parts by weight of sugar, and fifteen (15) to fifty (50) parts by weight of water to form a dough, separating the dough into small pieces, heating the dough at a temperature sufficient to render same insoluble when incorporated in bakery products, said dough being heated until the sugars therein have been caramelized, cooling the caramelized cereal grain product, crushing the pieces thereof to a fine powder, adding one-half (½) part by weight of lecithin to and incorporating the same with a mixture consisting of two (2) parts by weight of cinnamic aldehyde and seven and one-half (7½) parts by weight vegetable oil and adding the thus treated spice oil to the cooled caramelized cereal grain product, and impregnating the particles thereof with said treated spiced oil.

GUSTAV H. RAPAPORT.

REFERENCES CITED

The following references are of record in the file of this patent:

UNITED STATES PATENTS

| Number | Name | Date |
|---|---|---|
| 1,380,815 | Luft | June 7, 1921 |
| 2,019,494 | Jordan | Nov. 5, 1935 |
| 2,113,216 | Mitchell | Apr. 5, 1938 |
| 2,165,828 | Allen | July 11, 1939 |
| 2,246,528 | Musher | June 24, 1941 |
| 2,356,501 | Brown et al. | Aug. 22, 1944 |

FOREIGN PATENTS

| Number | Country | Date |
|---|---|---|
| 26,038 | Australia | Nov. 20, 1925 |

OTHER REFERENCES

"Dictionary of Cookery," Cassell, Petter, Galpin & Co., New York, page 216.